United States Patent [19]
Hasegawa et al.

[11] Patent Number: 4,543,834
[45] Date of Patent: Oct. 1, 1985

[54] MEASUREMENT OF VELOCITY IN WATER FLOW MODEL

[75] Inventors: Toshiaki Hasegawa, Saitama; Yasuo Hirose, Kanagawa, both of Japan

[73] Assignee: Nippon Furnace Kogyo Kaisha, Ltd., Tokyo, Japan

[21] Appl. No.: 550,015

[22] Filed: Nov. 8, 1983

[30] Foreign Application Priority Data

Nov. 10, 1982 [JP] Japan ................. 57-196097

[51] Int. Cl.$^4$ ................. G01F 1/00
[52] U.S. Cl. ................. 73/861.05; 356/28
[58] Field of Search ......... 73/861.05, 861.06; 250/574; 356/28

[56] References Cited

U.S. PATENT DOCUMENTS 3,762,221 10/1973 Coultnard ................. 73/861.06
4,201,467 5/1980 Hartmann et al. ................. 356/28

FOREIGN PATENT DOCUMENTS 2029569 3/1980 United Kingdom .

OTHER PUBLICATIONS

Matthes et al., "Measurement of the Velocity of Gas Bubbles in Water by a Correlation Method", in Rev. Sci. Anst., vol. 41, #6, pp. 843–845.

Primary Examiner—Herbert Goldstein
Attorney, Agent, or Firm—Gordon W. Hueschen

[57] ABSTRACT

The measurement of the velocity of a flow in a water flow model, characterized by conducting into a model water tank water containing a large volume of fine, uniform air bubbles to form a simulated field of flow; projecting a slit of light on said field of flow; photographing the slit of light beams with a television camera and displaying said photographed beams of light on the screen of a monitor television set; measuring changes of said displayed, irregularly reflected beams of light at two close points with two photosensors on said screen; determining a time interval in the changes of irregularly reflected beams of light at said two close points and finding the velocity of said flow with said time interval taken as defining the duration required for the pictured aggregate of air bubbles to move from one to the other of said two photosensors.

6 Claims, 5 Drawing Figures

MEASUREMENT OF VELOCITY IN WATER FLOW MODEL

BACKGROUND OF THE INVENTION

FIELD OF THE INVENTION AND PRIOR ART

This invention relates to a method for measuring the velocity of water flow at a given point in a field of flow set up under a non-contact condition within a water flow model, i.e., a device for simulating fluid flow by observing flow in a water simulator or flow model.

This application is related to our copending application Ser. No. 550,005, filed Nov. 9, 1983.

Heretofore, for the measurement of the velocity in a water flow model, the method which makes use of a Pitot tube and the method of electric measurement which utilizes the phenomenon that the volume of electric current flowing through a sensor (formed of an electric wire) is varied in proportion as the volume of heat taken away from the sensor varies with the change in the velocity of flow have been available. These conventional methods for measurement of the velocity of flow inevitably necessitate installation of the Pitot tube and the sensor respectively within the fields of flow and, consequently, causes flow of water to flow in paths deviating from the paths which would naturally form if the Pitot tube and the sensor were not installed in the fields. The Pitot tube further is incapable of being installed in any narrow field of flow. This drawback applies also to the sensor which is used for the method of electric measurement because the sensor requires a steady support structure which is capable of resisting vibrations. Further in either of the methods of measurement under discussion, changes in the velocity of flow cannot be grasped in the form of numerical values displayed through the medium of any measuring instrument and can never be evaluated even roughly through visual observation. It is, of course, never possible for the momentary condition of the field of flow to be visually observed at the same time that the velocity of flow is measured.

The conventional methods available for the measurement of the velocity of a flow in the water flow model cannot provide accurate measurement of the velocity, because they have been unable to measure the velocity under a non-contact condition. In the field of flow which entails a reaction and a heat transfer such as, for example, the actual combustion, since the fluid expands and loses viscosity, it is not sufficient to graphically analyze the change in concentration. Unless the velocity is determined, the actual combustion cannot be accurately predicted. In this respect, it has been important and desirable as well for the velocity of a flow to be accurately measured in order that the water flow model may function as a faithful simulator of the actual phenomenon.

SUMMARY OF THE INVENTION

This invention is aimed at satisfying the desiderata mentioned above. An object of this invention, therefore, is to provide a method capable of accurately measuring the velocity of a flow at a given point in a field of flow set up under a non-contact condition within a water flow model.

This invention attains this object by conducting compressed water into a model water tank through an orifice having at least one hole not more than 3 mm in diameter pierced therethrough, thereby allowing a phenomenon of deaeration resulting from a local pressure drop of said water during the passage thereof through the orifice to induce release of a large volume of fine, uniform air bubbles into said flow and causing the portions of said flow densely containing said fine, uniform air bubbles to give rise to a field of flow within said water tank; projecting a slit of light on said field of flow and visualizing said flow in a given cross section by virtue of the irregular reflection of light on said air bubbles; and optically determining the time taken by the aggregate of said air bubbles in traversing a fixed distance, advantageously, by photographing said irregularly reflected beams of light with a television camera and displaying said photographed beams of light on the screen of a monitor television set, and measuring changes of said displayed, irregularly reflected beams of light at two close points with two photosensors on said screen; and determining a time interval in the changes of irregularly reflected beams of light at said two close points on the basis of mutual, interrelated functions and finding the velocity of said flow with said time interval taken as defining the duration required for the pictured aggregate of air bubbles to move from one to the other of said two photosensors.

Particularly, the invention comprises a method for the measurement of the velocity of a flow in a water flow model, characterized by the steps of conducting compressed water into a model water tank through an orifice having at least one hole not more than 3 mm in diameter pierced therethrough, thereby allowing a phenomenon of deaeration resulting from a local pressure drop of said water during the passage thereof through the orifice to induce release of a large volume of fine, uniform air bubbles into said flow and causing the portions of said flow densely containing said fine, uniform air bubbles to give rise to a field of flow within said water tank, projecting a slit of light on said field of flow and visualizing said flow in a given cross section by virtue of the irregular reflection of light on said air bubbles; photographing said irregularly reflected beams of light with a television camera and displaying said photographed beams of light on the screen of a monitor television set; measuring changes of said displayed, irregularly reflected beams of light at two close points with two photosensors on said screen; determining a time interval in the changes of irregularly reflected beams of light at said two close points on the basis of mutual, interrelated functions; and finding the velocity of said flow with said time interval taken as defining the duration required for the pictured aggregate of air bubbles to move from one to the other of said two photosensors.

DESCRIPTION OF THE PREFERRED EMBODIMENTS

Now the method of the invention will be described in detail below with reference to typical devices for working the invention.

Figure 1:
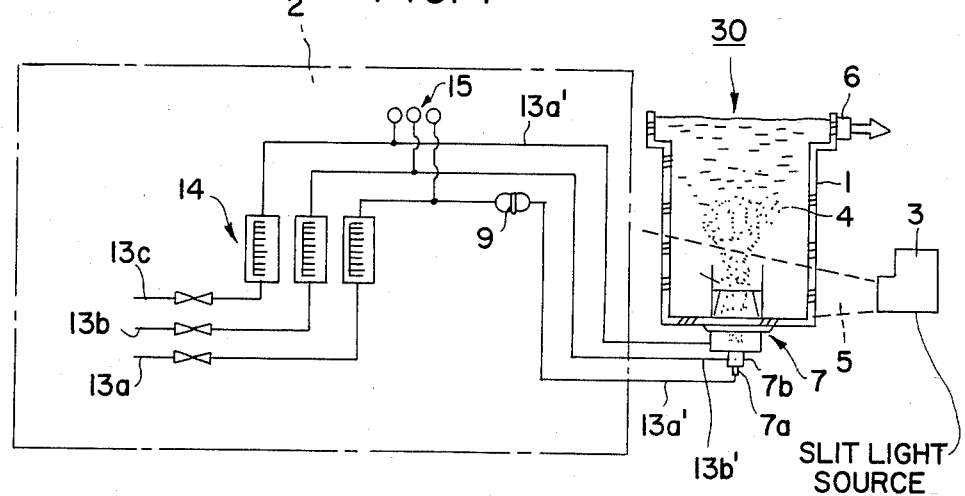
FIG. 1 is a schematic diagram illustrating a visualizing device according to this invention for the liquid flow in the field of flow entailing a combustion reaction.

FIG. 1 is a schematic drawing illustrating a water flow model visualizing device 30-31 to be used for working the method of this invention. This device mainly comprises a model water tank 1 for reproducing a field of flow desired to be visualized (hereinafter referred to as "water tank"), a fluid supply unit 2 for supplying a fluid such as water containing therein air bubbles 4 into the water tank via the bottom side thereof, and a slit light source 3 for projecting a slit light 5 upon the field of flow within the water tank 1. In the visualizing device, the fluid which has flowed into the water tank 1 through the bottom side thereof is utilized for reproducing a field of flow within the water tank 1 and then released through a water discharge outlet 6 at the top of the water tank 1 and discarded via a drainage pipe (not shown in the diagram). The spent water thus discharged contains no foreign particles other than air bubbles and the air bubbles, except for a small portion thereof, are dissolved again into the water. Thus, the spent water may be safely released in its unaltered state into a nearby drainage system. Optionally it may be put to reuse in its unaltered state. The fluid may be introduced downwardly into the water tank 1 from above and discharged via the bottom side. It may otherwise be introduced sideways via one lateral side of the water tank 1.

The supply unit 2 which supplies water to the aforementioned water tank 1 comprises a water source which is not shown, sometimes herein referred to simply as "compressed or pressurized water", connected through conduit or flow line 13a, orifice 9, and conduit 13a' with a fluid spurting inlet 7a of the water tank 1. The phenomenon of deareation resulting from a local pressure drop of the compressed water during the passage thereof through orifice 9 in part causes the air dissolved in the pressurized water being conveyed to emerge in the form of air bubbles 4 into the fluid. Thus, the fluid containing a large volume of air bubbles is supplied to water tank 1.

Supply unit 2 also supplies water which contains no air bubbles through flow line 13b' to fluid spurting inlet 7b. Each of the flow lines 13 can have flow meters 14 therein as well as pressure gauges 15.

If desired, a transparent cylinder 8 simulating a burner tile can be disposed in tank 1 coaxial with the inflow of water thereinto. Auxiliary air from line 13c' can be jetted into the water in tank 1 as a sheath around the water jetted thereinto through spurting inlets 7a and 7b.

Figure 3:
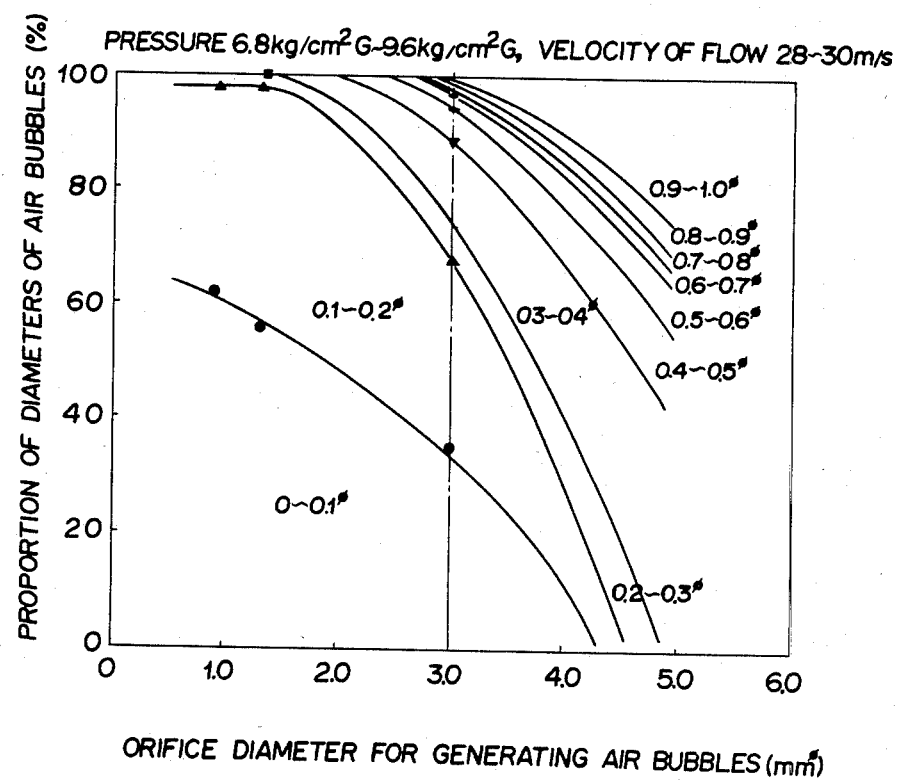
FIG. 3 is a graph showing the results of a test performed to find the relation between the orifice diameter and the proportions of diameters of air bubbles.

The orifice 9 comprises at least one small orifice or hole not more than 3 mm in diameter pierced therethrough. The diameter of the small hole in the orifice is closely related to the diameter and uniformity of the air bubbles 4 generated as described above. If the diameter of this hole exceeds 3 mm, the generated air bubbles 4 become so non-uniform as to render accurate measurement or quantitative measurement infeasable. Generally, when the air bubbles are used as a tracer, the diameter of the air bubbles optimal for the purpose of visualization is desired to fall in the range of 0.06 to 0.2 mm in due consideration of the possible error due to the poor ability of the air bubbles to follow the flow and the possible error due to the buoyancy of air bubbles. When the conditions necessary for preventing the dissolution of air bubbles 4 into the water from occurring too early is taken into account, the diameter is desired to fall in the neighborhood of 0.1 mm. According to the results of the experiment (FIG. 3) conducted by the inventors in search for the relation between the diameter of the orifice 9 and the proportions of particle diameters of the generated air bubbles 4, it is noted that when the orifice 9 has a diameter of 3 mm, air bubbles having diameters of not more than 0.2 mm which are optimal for the visualization account for about 70% of all the air bubbles generated and these air bubbles have an average diameter of 0.113 mm and enjoy generally fair uniformity and that when the orifice 9 has a diameter of 4 mm, air bubbles having diameters of not more than 0.2 mm account for about 30% of all the air bubbles and suffer from poor uniformity. The results of the experiment indicate that the desirable diameter of the orifice is 1.5 mm or under and the most desirable diameter is between 0.8 mm and 0.5 mm. The reason for the lower limit 0.5 mm fixed for the diameter of the orifice 9 is that the orifice 9 having a smaller diameter may possibly be clogged with dirt from the fluid and prevented from stably generating air bubbles. Where a filter capable of completely removing dirt from the fluid is installed on the upstream side of the flow, the orifice may have a smaller diameter than 0.5 mm. According to the results of FIG. 3, it is noted that when the diameter of the orifice is fixed at 0.8 mm and the pressure applied to the water at 9 kg/cm$^2$, the air bubbles 4 generated have diameters in the range of 0.0781 to 0.2106 mm. This diameter distribution has been confirmed by observation of an enlarged photograph through a microscope. In this case, the air bubbles have an average diameter of about 0.1 mm, which may be called the most desirable diameter for the purpose of visualization. A desired increase in the flow volume of air bubbles may be obtained by increasing the number of small holes pierced through the orifice 9. This addition to the number of small holes concurrently serves to ensure the constancy of the content of air bubbles in the flow.

The water tank 1 in the present embodiment is formed of a material previous to light such as, for example, acrylic resin or glass in the shape of a rectangular cylinder having a square cross section. It is provided in the top side with the water discharge outlet 6 and in the bottom side with the fluid inlet 7. When the water tank 1 is intended as a water flow model such as of a nozzle or burner, for example, it functions only as a vessel for the formation of a field of flow. When it is intended for visualizing the flow of a fluid within a furnace, the water tank 1 itself is utilized as part of the model. Thus, the shape of the water tank 1 is not limited to that which is illustrated in the diagram. The water tank 1 may be in the shape of a circular tube or an elbow pipe or in any other shape adapted to suit the purpose for which the water tank 1 is used. Further, the fluid spurting inlet 7 formed on the bottom side of the water tank 1 is generally fitted with a model for reproducing a field of flow desired to be observed, such as a nozzle model or burner model, for example. There are times when such a model is installed inside the water tank 1 as separated from the fluid spurting inlet 7a so that the flow emanating from the fluid spurting inlet 7a may be left unaffected. In the case of the present embodiment, a burner nozzle model 10 and a burner tile model 11 are installed.

For the purpose of studying the condition in which a fuel and air are mixed and measuring the proportions of the two fluids, a fluid incorporating air bubbles 4 (simulating a fuel) is spurted through the spurting inlet 7a of the burner nozzle model 10 and, at the same time, a fluid incorporating no air bubbles (simulating a secondary air) is spurted through an annular spurting inlet 7b at the periphery of the burner nozzle model 10, so that the two fluids thus spurted are allowed to mix with each other inside the burner tile model 11. Of course, there is no reason at all for limiting the number of fluid spurting inlets 7 and the positions thereof to those illustrated in the diagram. The water flow model may require installation of a plurality of burners in a furnace, for example, where the effect the positions of such burners have upon the distribution of heat is desired to be studied by utilizing the water flow model. It is also sometimes desirable to jet auxiliary air into tank 1 through an annular ring of jet ports 16 connected with the air supply line 13c'.

Since the water tank 1 in the present embodiment has all the walls thereof made of a material previous to light, the wall opposed to the human observer or the instrument for observation constitutes itself an inspection window and the side opposed to the slit light source 3 constitutes itself a window for the incident light. All the walls of the water tank 1 are not required to be made of material previous to light. The water tank 1 fulfills its purpose amply so far as at least the sides serving as the inspection window and the window for the incident light are made of such a material. The inspection window and the window for the incident light permit occurrence of irregular reflection of light under the best condition when they are positioned so as to form angles in the range of 90° to 145° relative to the direction of the incidence of the slit light 5. Thus, these windows may be installed in such positions to fulfill their parts. When the water tank 1 is formed in the shape of a circular tube, the portion of the circular wall corresponding to 90° to 145° of the entire circumference of its cross section can be made of the material previous to light, thus ensuring fulfillment of the function of the water tank 1. When the walls of the water tank 1 other than those serving as the inspection window and the window for the incident light are made of a material capable of absorbing light, the observation of air bubbles is facilitated because the air bubbles are enabled by the irregularly reflected beams of light to become amply conspicuous without requiring the illumination within the observation room to be decreased. The light absorbing material for this purpose may be a black coating applied to the inner sides of the aforementioned walls of the water tank 1. When the condition of the field of flow is to be observed in a plane perpendicular to the direction of flow, namely in a cross section of the water tank 1, the range of 90° to 145° relative to the slit light 5 passing the field of flow transversely falls in the direction of the ceiling of the water tank 1. In this case, therefore, the human observer is required to look down into the water tank 1 from above and the instrument for observation is required to be disposed above the water tank 1.

As the slit light source 3 for projecting the slit light 5 into the water tank 1, any of the known means available for this purpose may be adopted. For example, a plate containing a slit may be inserted into a slide projector to obtain a slit light. In this case, preparation of several plates containing a slit in a varied direction permits projection of a slit light 5 passing the flow in a desired cross section. When the slit light 5 impinges upon air bubbles 4, it is irregularly reflected. The irregularly reflected beams of light are of such nature that they will be best detected in the range of 90° to 145° relative to the direction of the incidence of the light. When the air bubbles 4 have diameters amply small and uniform, the intensity of the irregularly reflected beams of light is believed to be directly proportional to the number of air bubbles in a unit volume of flow, namely the density of air bubbles. This means that the intensity of the irregularly reflected beams of light corresponds to the concentration.

Figure 4:
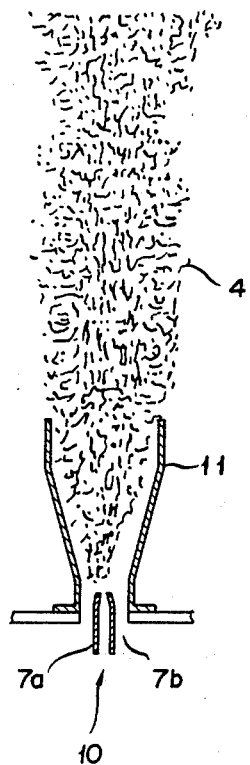
FIG. 4 is an explanatory diagram illustrating a visualized field of flow.

First, during the transfer of the fluid under pressure from the compressed water source to the water tank 1, the air dissolved in the fluid is densely released into the fluid in the form of fine, uniform air bubbles optimal for visualization by virtue of the phenomenon of deaeration which results from a local pressure drop of the compressed fluid during the passage thereof through the orifice 9. The portion of the fluid densely containing therein fine, uniform air bubbles gives rise to a field of flow as desired within the water tank 1. When the slit light 5 is projected to the field of flow, the slit light 5 is irregularly reflected by the air bubbles 4. The air bubbles 4 thus contained in the flow, therefore, are made to appear clearly like dots of light as illustrated in FIG. 4. Thus, the flow is visualized. In this case, the intensity of the irregularly reflected beams of light is believed to be directly proportional to the number of air bubbles in the unit volume of flow, namely, the density of air bubbles. Since this fact implies that the intensity of the irregularly reflected beams of light is directly proportional to the concentration, the density of the distribution of air bubbles in the flow, namely, the concentration, may be visually observed from the viewpoint of the intensity of the irregularly reflected beams of light.

Figure 2:
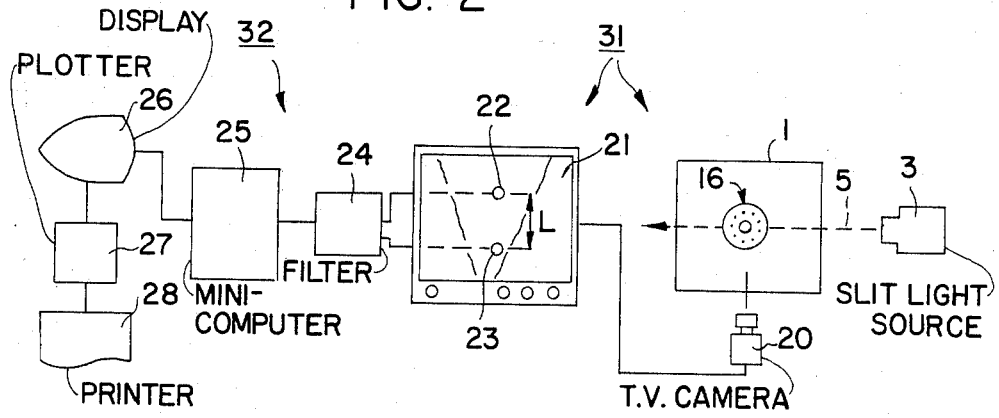
FIG. 2 is a schematic diagram illustrating a device for measuring irregularly reflected beams of light and an arithmetic circuit part.

The flow caused within the water tank 1, as illutrated in FIG. 2, is photographed with a TV camera 20 installed in front of the water tank and displayed on the screen of a monitor television 21. Then, the change in concentration or the change in irregularly reflected beams of light at a given point on the screen is measured with a photosensor 22 on the screen and is detected in the form of an electric signal such as, for example, a change in potential difference.

Although the flow of fluid may be visualized by using air bubbles 4 as a tracer, it is not possible to select one specific air bubble 4 out of an aggregate of numerous air bubbles and measure the time required for this particular air bubble to move across a prescribed distance L. In the field of flow which is produced by the portion of fluid containing fine, uniform air bubbles densely aggregated therein, however, the phenomenon of movement of an aggregate formed of air bubbles in a certain concentration appears as a change in concentration at one given point of observation. This phenomenon of the movement of the aggregate of air bubbles at some other very closely located point appears as a change in concentration having a very similar waveform. These observations have led the inventors to a knowledge that the time required by the aggregate of air bubbles in moving across the distance between two closely located points can be grasped as a time interval in the changes of concentration between the two points.

Now, therefore, one more photosensor 23 is set up on the screen of the monitor television 23 so that changes in concentration, namely, changes in irregularly reflected beams of light are respectively measured at the two close points. The photosensors 22, 23 are intended to convert optical signals into electrical signals. In the present embodiment, photodiodes are used as photosensors. They may be other forms of photosensors.

Figure 5:
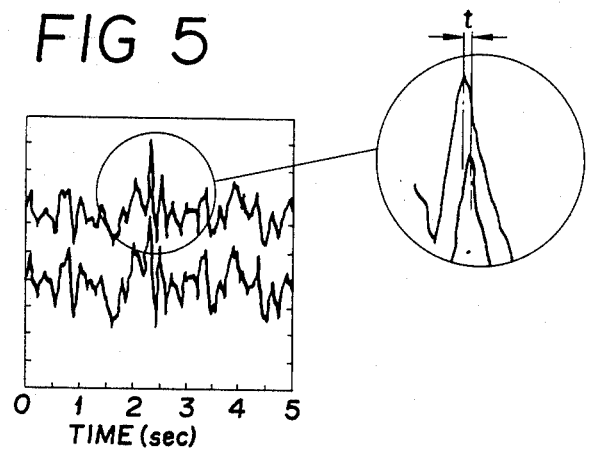
FIG. 5 is a graph showing the phases of changes in concentration measured by the photosensors in the arrangement of FIG. 2.

The output of the photosensors is analyzed in an arithmetic circuit 33 in which momentary changes in concentration which have been converted into electrical signals through the medium of these photosensors 22, 23 are now passed through a filter 24 to be deprived of scan signals used on the picture screen of the monitor television 21 and then fed into a mini-computer 25. In the mini-computer 25, the time interval and the maximum time lag in the changes in concentration which occur at the points of measurement are computed by the mutual interrelation function method. As pointed out above, the changes in concentration which occur at the two close points of measurement are similar to each other as illustrated in FIG. 5. These changes in concentration at the respective points of measurement are statically processed to find characteristic peaks. Then, on the basis of these characteristics peaks, the maximum time lag, t, is computed. Once the maximum time lag, namely the time, $\Delta t$, required by the aggregate of air bubbles in moving across the distance between the two photosensors 22, 23, is found out, the velocity is readily found in accordance with the formula, $v = \Delta L/\Delta t$, because the distance $\Delta L$ between the two photosensors 22, 23 has been fixed in advance.

The velocity thus computed at the mini-computer 25 is fed out into a display 26, in which the measured value of this velocity is displayed on the screen of the display 26. Further at an XY plotter 27, the successively measured values are plotted in the XY coordinates system, with the changes in velocity displayed therein two-dimensionally. At a printer 28, these changes are printed out in numerical values.

The measurement of the brightness of the irregularly reflected beams of light of the screen of the monitor television 21 must be carried out by keeping the monitor ajusted so that the minimum output in the range of measurement such as, for example, about 3 mV may appear even in the darkest portion of the whole zone of measurement and the near maximum output in the range of measurement may appear in the brightest portion. The positions of measurement may be altered by moving the photosensors 22, 23 on the screen of the monitor television 21. It is of advantage, however, to adjust the position of the picture on the screen (represented by the large V) by moving the TV camera with a traverse (not shown) without moving the photosensors 22, 23, because the central portion of the screen assumes stabler and higher brightness than the peripheral portion. The measurement of the irregularly reflected beams of light is not always required to proceed simultaneously with the reproduction of the field of flow within the water tank 1. When the field of flow reproduced within the water tank 1 is photographed with the TV camera 20, the pictures of the field of flow thus photographed may be recorded on video tape. Then, the desired measurement of the velocity can be carried out at any future time by having the recorded pictures replayed on the monitor television 21. Even when the field of flow is narrow and complicated, the photography effected by the use of a zoom lens will permit relative size reduction of the photosensors 22, 23, as required, and ensure safe measurement.

As is clear from the foregoing description, the method of this invention effects the measurement of the velocity of flow by reproducing a field of flow within the water tank with the fluid densely containing fine, uniform air bubbles, projecting slit light on the field of flow, thereby visualizing the flow in a given cross section by virtue of the irregular reflection of light on the air bubbles and, at the same time, photographing the irregularly reflected beams of light with the television camera and displaying them on the screen of a monitor television, measuring changes in the irregularly reflected beams of light at two close points with two photosensors on the aforementioned screen, determining the time interval in the changes of the irregularly reflected beams of light at the two close points by means of mutual interrelated functions, and finding the velocity with the time interval taken as the time required for the aggregate of air bubbles in moving across the distance between the aforementioned two photosensors. Thus, this method is capable of accurately measuring the velocity in a non-contact condition. In other words, by the method of this invention, the measurement of the velocity can be effected accurately because no sensor is installed within the field of flow and, consequently, nothing interferes with the flow. Moreover, in the present method of measurement, since the field of flow is formed with the fluid containing air bubbles in advance of the actual measurement of velocity and the slit light is projected on the field of flow to visualize the flow in a given cross section, visual observation of the velocity of flow and qualitative measurement of the condition of the field of flow can be carried out at the same time that the velocity is measured with a measuring instrument. Besides, the change in concentration throughout the entire field of flow can be visualized by virtue of the change in the irregularly reflected beams of light. Further, since the method of this invention adopts an arrangement for the field of flow to be photographed with a television camera, then displayed on the monitor television, and thereafter subjected to measurement with the photosensors, it is capable of measuring any desired portion of the field of flow as enlarged to any desired scale. When the pictures of the field of flow photographed as described above are recorded on a video tape, the method of this invention permits the measurement of the velocity to be carried out at any future time without necessitating any experiment with an actual flow.

It is to be understood that the invention is not to be limited to the exact details of construction, operation, or exact materials or embodiments shown and described, as obvious modifications and equivalents will be apparent to one skilled in the art, and the invention is therefore to be limited only by the full scope of the appended claims.

We claim:

1. A method for the measurement of the velocity of a flow in a water flow model, characterized by the steps of conducting compressed aerated water into a model water tank through an orifice having at least one hole not more than 3 mm in diameter pierced therethrough, thereby allowing a phenomenon of deareation resulting from a local pressure drop of said water during the passage thereof through the orifice to induce release of a large volume of fine, uniform air bubbles into said flow and causing the portions of said flow containing a dense concentration of said fine, uniform air bubbles to give rise to a field of flow within said water tank; projecting a slit of light on said field of flow and thereby making said flow visible in a given cross section by virtue of the irregular reflection of light on said air bubbles; and optically determining the time taken by the aggregate of said air bubbles in traversing a fixed distance.

2. A method of claim 1, which further comprises photographing said irregularly reflected beams of light with a television camera and displaying said photographed beams of light on the screen of a monitor television set, and measuring changes of said displayed, irregularly reflected beams of light at two close points with two photosensors on said screen.

3. A method of claim 1, which further comprises determining a time interval in the changes of irregularly reflected beams of light at said two close points on the basis of mutual, interrelated functions, and finding the velocity of said flow with said time interval taken as defining the duration required for the pictured aggregate of air bubbles to move from one to the other of said two photosensors.

4. A method for the measurement of the velocity of a flow in a water flow model, characterized by the steps of conducting compressed aerated water into a model water tank through an orifice having at least one hole not more than 3 mm in diameter pierced therethrough, thereby allowing a phenomenon of deareation resulting from a local pressure drop of said water during the passage thereof through the orifice to induce release of a large volume of fine, uniform air bubbles into said flow and causing the portions of said flow containing a dense concentration of said fine, uniform air bubbles to give rise to a field of flow within said water tank; projecting a slit of light on said field of flow and thereby making said flow visible in a given cross section by virtue of the irregular reflection of light on said air bubbles; photographing said irregularly reflected beams of light with a television camera and displaying said photographed beams of light on the screen of a monitor television set; measuring changes of said displayed, irregularly reflected beams of light at two close points with two photosensors on said screen; determining a time interval in the changes of irregularly reflected beams of light at said two close points on the basis of mutual, interrelated functions; and finding the velocity of said flow with said time interval taken as defining the duration required for the pictured aggregate of air bubbles to move from one to the other of said two photosensors.

5. A method of claim 1, in which the air bubbles have an average diameter of about 0.1 mm.

6. A method of claim 4, in which the air bubbles have an average diameter of about 0.1 mm.

* * * * *

UNITED STATES PATENT AND TRADEMARK OFFICE
CERTIFICATE OF CORRECTION

PATENT NO. : 4,543,834

DATED : October 1, 1985

INVENTOR(S) : Toshiaki Hasegawa and Yasuo Hirose

It is certified that error appears in the above-identified patent and that said Letters Patent is hereby corrected as shown below:

Title page, [75], lines 1 and 2; "Saitama" should read -- Saitama-ken -- and "Kanagawa" should read -- Kanagawa-ken --

Title page, [56] References Cited, U.S. PATENT DOCUMENTS, line 1; "Coultnard" should read -- Coulthard --

Title page, [56] References Cited; OTHER PUBLICATIONS, line 3; "Anst.," should read -- Inst., --

Title page and Sheet 1, Figure 1 of drawings, approximately the middle of the drawing at the top; "13a'" should read -- 13c' -- and on the right hand side of the drawing, approximately in the center, there is a line in the drawing without a number, insert -- 8 -- at that place.
Both corrections are circled and shown in the drawing below:

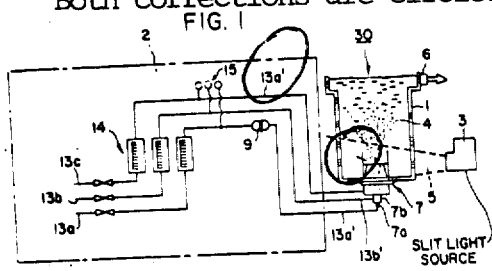 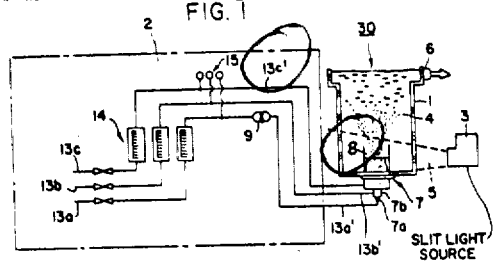

UNITED STATES PATENT AND TRADEMARK OFFICE
CERTIFICATE OF CORRECTION

PATENT NO. : 4,543,834

DATED : October 1, 1985

INVENTOR(S) : Toshiaki Hasegawa and Yasuo Hirose

It is certified that error appears in the above-identified patent and that said Letters Patent is hereby corrected as shown below:

Col. 3, line 38; after "shown," insert -- of pressurized, aerated water, --

Col. 4, line 47; "previous" should read -- pervious --
Col. 5, lines 24, 30 & 43; "previous" should read -- pervious --
Col. 6, line 41; "illutrated" should read -- illustrated --
Col. 8, line 64; "deareation" should read -- deaeration --
Col. 10, line 1; "deareation" should read -- deaeration --

Signed and Sealed this

Eleventh Day of February 1986

[SEAL]

Attest:

DONALD J. QUIGG

Attesting Officer

Commissioner of Patents and Trademarks